(12) United States Patent
Maaref et al.

(10) Patent No.: US 10,448,370 B2
(45) Date of Patent: *Oct. 15, 2019

(54) SYSTEM AND METHOD FOR VIRTUAL MULTI-POINT TRANSCEIVERS

(71) Applicant: Huawei Technologies Co., Ltd., Shenzhen (CN)

(72) Inventors: Amine Maaref, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/256,238

(22) Filed: Sep. 2, 2016

(65) Prior Publication Data

US 2016/0374066 A1    Dec. 22, 2016

Related U.S. Application Data

(63) Continuation of application No. 14/177,019, filed on Feb. 10, 2014, now Pat. No. 9,439,176.

(51) Int. Cl.
| | |
|---|---|
| *H04W 72/00* | (2009.01) |
| *H04W 72/04* | (2009.01) |
| *H04W 4/08* | (2009.01) |
| *H04L 5/00* | (2006.01) |
| *H04W 76/14* | (2018.01) |

(52) U.S. Cl.
CPC ....... *H04W 72/0406* (2013.01); *H04L 5/0035* (2013.01); *H04W 4/08* (2013.01); *H04W 76/14* (2018.02)

(58) Field of Classification Search
CPC ................................................. H04W 72/0406
See application file for complete search history.

(56) References Cited

U.S. PATENT DOCUMENTS

| | | | |
|---|---|---|---|
| 8,634,763 B2 | 1/2014 | Oyman et al. | |
| 2009/0262678 A1 | 10/2009 | Oyman et al. | |
| 2009/0280797 A1 | 11/2009 | So et al. | |

(Continued)

FOREIGN PATENT DOCUMENTS

| | | |
|---|---|---|
| CN | 101965060 A | 2/2011 |
| CN | 102833755 A | 12/2012 |

(Continued)

OTHER PUBLICATIONS

Huawei Technologies Co., Ltd., International Search Report & Written Opinion, International Application No. PCT/CN2015/072495, dated May 15, 2015, 12 pages.

(Continued)

*Primary Examiner* — Justin Y Lee
(74) *Attorney, Agent, or Firm* — Slater Matsil, LLP

(57) ABSTRACT

A method embodiment includes receiving, by a network device, a cooperation candidate set (CCS) and determining a cooperation active set (CAS). The CCS includes a plurality of potential cooperating user equipment (CUEs) for selection to the CAS, and the plurality of potential CUEs is selected from a plurality of user equipment (UEs) in the network. The CAS is a set of CUEs selected from the CCS. A target user equipment (TUE) and the set of CUEs form a virtual multipoint transceiver.

32 Claims, 4 Drawing Sheets

(56) References Cited

U.S. PATENT DOCUMENTS

| | | | |
|---|---|---|---|
| 2012/0157139 A1* | 6/2012 | Noh | H04W 72/0406 455/501 |
| 2013/0034038 A1* | 2/2013 | Jang | H04B 7/022 370/312 |
| 2013/0034136 A1 | 2/2013 | Park et al. | |
| 2014/0098731 A1 | 4/2014 | Maaref et al. | |
| 2014/0241254 A1 | 8/2014 | Kaur et al. | |
| 2016/0135033 A1 | 5/2016 | Cho et al. | |

FOREIGN PATENT DOCUMENTS

| | | |
|---|---|---|
| CN | 102870340 A | 1/2013 |
| CN | 102905277 A | 1/2013 |
| JP | 2011514109 A | 4/2011 |
| JP | 2013524648 A | 6/2013 |
| KR | 20090117244 A | 11/2009 |
| KR | 20100124833 A | 11/2010 |
| KR | 20120041144 A | 4/2012 |
| KR | 20130077815 A | 7/2013 |
| KR | 20130082447 A | 7/2013 |
| WO | 2012161531 A2 | 11/2012 |
| WO | 2013111818 A1 | 8/2013 |
| WO | 2013160795 A1 | 10/2013 |

OTHER PUBLICATIONS

Raghothaman et al., "System Architecture for a Cellular Network with Cooperative Mobile Relay", InterDigital Communications LLC, IEEE, 2011, Date of Conference Sep. 5-8, 2011, pp. 1-5.

Vanganuru et al., "Uplink System Capacity of a Cellular Network with Cooperative Mobile Relay", InterDigital Communications LLC, IEEE, 2011, Date of Conference Apr. 13-15, 2011, pp. 1-7.

* cited by examiner

SYSTEM AND METHOD FOR VIRTUAL MULTI-POINT TRANSCEIVERS

CROSS-REFERENCE TO RELATED APPLICATIONS

This application is a continuation of U.S. patent application Ser. No. 14/177,019, filed on Feb. 10, 2014, which application is hereby incorporated herein by reference.

TECHNICAL FIELD

The present invention relates generally to a system and method for wireless communications, and, in particular embodiments, to a system and method for device-centric transmitter and receiver virtualization.

BACKGROUND

Generally, future wireless networks may be more interference dominant, with ultra-dense deployment of transmission points. One method of managing interference and improving received signal quality involves operating the network in a hyper transceiver mode. Operating in a hyper transceiver mode relies on group-2-group (G2G) communications between a set of cooperative transmitters and a set of cooperative receivers. For example, a user equipment (UE) in a network may form a cooperative device mesh with other UEs to communicate cooperatively with one or more transmitters. These cooperative device meshes may be referred to as virtual multipoint transceivers and may be dynamically configured based on network conditions such as resource availability, UE cooperation strategies, channel conditions, and the like. Each virtual multipoint transceiver may include a target UE and a set of cooperating UEs, which help the target UE in uplink/downlink transmissions.

Furthermore, a transmission point in the network may form a cooperative cloud radio access network (CRAN) cluster with other transmission points to communicate cooperatively with the one or more virtual multipoint transceivers. These cooperative CRAN clusters may be referred to as virtual transmitters and may be dynamically configured based on network conditions such as resource availability, virtual multipoint transceiver cooperation strategies, channel conditions, energy saving considerations, and the like. Each virtual transmitter may include one or more serving transmission points, which can be dynamically updated in order to provide tailored quality of service/experience (QoS/QoE) to virtual multipoint transceivers. Dynamic point selection (DPS) is one such transmitter virtualization technique that dynamically tailors the serving transmission point to a specific target UE.

However, as the number of cooperating UEs and/or transmission points increases, the complexity of managing the virtual transmitters/transceivers (e.g., encoding/decoding complexities) also increases. Thus, while numerous cooperating transmission points and UEs may be selected for improved signal quality of a target UE, complexity considerations and/or energy saving aspects may limit the total number of cooperating transmission points and UEs used during transmission. Furthermore, the ability to dynamically reconfigure virtual transmitters/transceivers based on network conditions may also be limited by a desire to maintain the selection process at manageable complexity.

SUMMARY

These and other problems are generally solved or circumvented, and technical advantages are generally achieved, by preferred embodiments of the present invention which provides a system and method for device-centric transmitter and receiver virtualization.

In accordance with an embodiment, a method for forming a virtual multipoint transceiver includes a cooperation candidate set (CCS) and determining a cooperation active set (CAS). The CCS includes a plurality of potential cooperating user equipment (CUEs) for selection to the CAS, and the plurality of potential CUEs is selected from a plurality of user equipment (UEs) in the network. The CAS is a set of CUEs selected from the CCS. A target user equipment (TUE) and the set of CUEs form a virtual multipoint transceiver.

In accordance with another embodiment, a network device includes a processor, a computer readable storage medium storing programming for execution by the processor, and a transmitter for signaling a selected operation mode to a radio node in a network. The programming includes instructions to determine a cooperation candidate set (CCS) and determine a cooperation active set (CAS). The CCS includes a plurality of potential cooperating user equipment (CUEs) for selection to the CAS, and the plurality of potential CUEs is selected from a plurality of user equipment (UEs) in the network. The CAS is a set of CUEs selected from the CCS. A target user equipment (TUE) and the set of CUEs form the virtual multipoint transceiver.

In accordance with yet another embodiment, a method for forming a virtual multipoint transceiver includes determining, by a network device, a cooperating candidate set (CCS) and determining a CAS from the CCS. The CCS includes a plurality of potential cooperating user equipment (CUEs), and the CAS is a set of CUEs selected from the CCS. A target user equipment (TUE) and the set of CUEs form a virtual multipoint transceiver.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various embodiments are described in a specific context, namely a dynamic point selection (DPS) based network architecture using group-2-group (G2G) communications between a user equipment (UE) centric transmission point cluster (e.g., a virtual transmitter) and a UE centric virtual multipoint transceiver. Other embodiments, however, may be directed to any other network architectures having UE centric virtual transmitters and/or receivers, such as, a multicasting/multipath network architecture with collaborative network/rateless/fountain coding, cooperative multipoint (CoMP) based networks, or the like.

Various embodiments involve the selection of UE centric virtual multipoint transceivers. Devices (e.g., UEs) of the virtual multipoint transceiver acts as a virtual transmitter during uplink and/or a virtual receiver during downlink. Each virtual multipoint transceiver includes one or more target UE (TUEs) and a plurality of cooperating UEs (CUEs). The CUEs help the TUE communicate with the network, for example, during downlink reception and/or uplink transmission of data packets. Thus, the use of virtual multipoint transceivers improves overall throughput and coverage in the network. Selection of CUEs may include first selecting a TUE-centric cooperation candidate set (CCS) of potential CUEs, for example, based on relatively simplistic selection criteria (e.g., received reply content/ signal strength or UE location). Then, a cooperation active set (CAS) is selected from the CCS. The CAS is the CUEs that, together with the TUE, form the virtual multipoint transceiver. The CAS may be selected from the CUE based on access link and/or device-2-device (D2D) link qualities. Rather than consider all the UEs in a network (or all UEs within transmission range of a TUE) for CAS selection, the pre-selection of a CCS decreases the number of UEs for CAS selection to a manageable level. Thus, a UE-centric low complexity design for selecting cooperating UEs in a virtual multipoint transceiver while accounting for access link/D2D link quality is provided. Furthermore, the CCS and CAS may be configured based on long-term quality measurements to avoid the complexity of dynamic, real-time link assessment/selection.

Figure 1A:
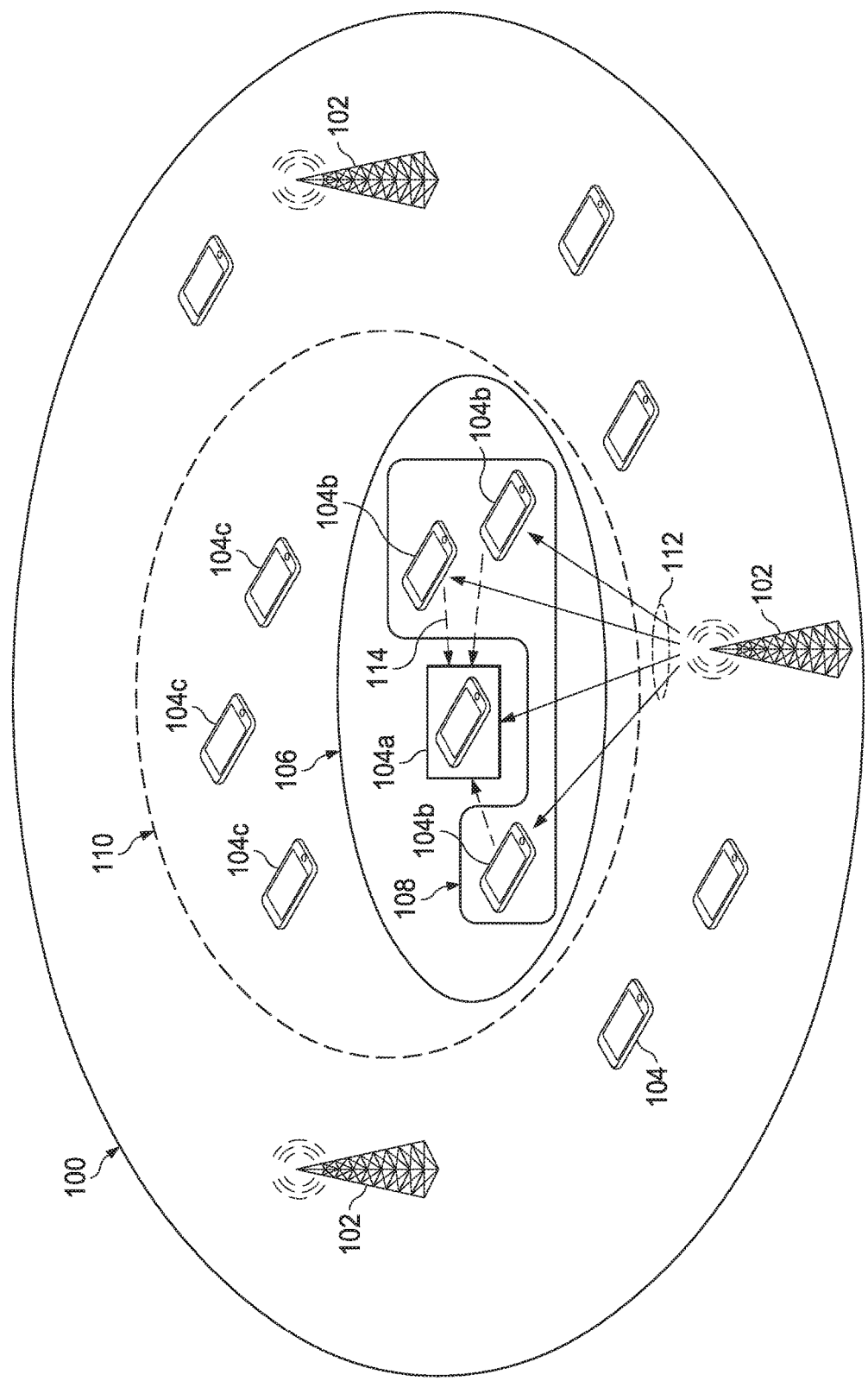
FIGS. 1A and 1B are block diagrams of a network having virtual multipoint transceivers in accordance with various embodiments.

FIG. 1A illustrates a block diagram of a network 100, which may operate in a dynamic point selection (DPS) system architecture in accordance with various embodiments. Network 100 includes a plurality of radio nodes, such as transmission points 102 and UEs 104. Transmission points 102 may be, for example, base stations, long term evolution (LTE) eNodeBs, WiFi access points, and the like. Alternatively, transmission points 102 may be virtual transmission points. For example, transmission points 102 may be a cluster of one or more traditional transmission points (e.g., base stations/eNodeBs/etc.) jointly communicating with UEs 104. Each virtual transmission point 102 may be selected based on quality of service (QoS) requirements, neighborhood relationships, and the like of a UE (e.g., TUE 104a).

Communications in network 100 may be between transmission points 102 and a device-centric virtual multipoint transceiver 106. Virtual multipoint transceiver 106 allows a TUE 104a to cooperatively receive downlink/transmit uplink packets with CUEs 104b. UEs 104 may be operating in an active state (e.g., actively receiving data from the network) or in an idle state (e.g., not actively receiving data from the network). Furthermore, some CUEs 104b may be dummy UEs, which may be strategically deployed UEs for helping TUE 104a.

Virtual multipoint transceiver 106 may be assigned a group ID by the network (e.g., by a network controller) for joint reception of transmissions. For example, in downlink transmissions a transmission point 102 associated with a particular virtual multipoint transceiver may multicast a transmission for TUE 104a to all the UEs in virtual multipoint transceiver 106 as identified by its network-assigned group ID. Packets from transmission point 102 to TUE 104a may be sent in two transmission phases. In the first transmission phase (known as the downlink multicast phase), transmission point 102 may multicast a transmission to virtual multipoint transceiver 106 (i.e., TUE 104a and CUEs 104b) across access links 112. In the second transmission phase (known as the data forwarding phase), CUEs 104b may forward received portions of the multicast transmission to TUE 104a across D2D links 114. In some embodiments, CUEs 104b may relay received portions of the multicast transmission using a decode-and-forward (DF) relay protocol. For example, CUEs 104b may decode the whole codeword of the received multicast transmission, re-encode the codeword, and forward the re-encoded transmission (or a portion thereof) to the TUE 104a across D2D links 114. Upon reception, TUE 104a may combine information received during the downlink multicast phase and the data forwarding phase to decode the transmission sent by the network. A similar procedure may be applied for uplink transmissions. Furthermore, CUEs 104b may operate in a half-duplex mode or a full-duplex mode. In a half-duplex mode, CUEs 104b may not receive data from the network and simultaneously forward data to TUE 104a in the same time and frequency resources. In a full-duplex mode, CUEs 104b may receive data and forward data simultaneously. Other forwarding protocols, such as amplify-and-forward (where CUEs 104b transmit an amplified version of the received multicast transmission to TUE 104a), compress-and-forward (where CUEs 104b quantizes the received multicast transmission and transmits a re-encoded quantized multicast transmission to TUE 104a), or the like, may also be used.

CUEs 104b may be selected on a TUE 104a centric basis. For example, a CCS 110 of potential CUEs 104c may be selected for a TUE based on relatively simple selection criteria (e.g., received reply content/signal strength or UE location). Then a CAS 108 may be selected from the potential CUEs 104c of CCS 110 based on quality of access links 112 (e.g., between the potential CUEs 104c and a transmission point 102) and/or D2D links 114 (e.g., between the potential CUEs 104c and TUE 104a). CAS 108 includes CUEs 104b, which together with TUE 104a form virtual multipoint transceiver 106. The selection criteria for CCS 110 and CAS 108 may be described in greater detail in subsequent paragraphs.

Because the selection of CUEs 104b is TUE 104a centric, configurations of virtual multipoint transceivers 106 may vary across network 100 based on which UEs are TUEs 104a. Furthermore, although a particular configuration of network 100 is illustrated in FIG. 1A, other networks may include different configurations of and a number of network elements (e.g., transmission points 102/UEs 104). Based on changes in network conditions (e.g., quality of access links 112/D2D links 114), CCS 110 and CAS 108 may be updated semi-statically. For example, CCS 110 may be updated every several hundred transmission time intervals (TTIs), and CAS 108 may be updated every hundred TTIs. Less frequent updates may simplify the complexity of measuring or predicting access links 112/D2D links 114. Other time intervals for updating CCS 110 and CAS 108 may be applied in alternative embodiments.

In other embodiments, updating CCS 110 and/or CAS 108 may also be based on the changes to the transmission points 102 associated with TUE 104a, CUEs 104b, and/or potential CUEs 104c. For example, a virtual transmission point 102 may be dynamically selected for a virtual multipoint transceiver 106 based on the status (e.g., QoE requirements, neighborhood relations, and the like) of TUE 104 and/or network status (e.g., energy saving considerations). Based on TUE 104 status and/or network status, the virtual transmission point 102 may be dynamically updated, and based on this dynamic updating, the virtual multipoint transceiver 106 may also be updated.

Furthermore, although virtual multipoint transceiver 106 is illustrated as having one TUE 104, in other embodiments, a virtual multipoint transceiver 106 may include multiple TUEs 104. For example, during multicast transmission, transmission points 102 may send the same packet to more than one UE. Thus, a virtual multipoint transceiver 106 may be formed having more than one TUE 104. In such embodiments, the selection of the virtual multipoint transceiver 106 may be based on D2D link quality, access link quality, location, capacity, and/or other selection criteria of all TUEs 104.

Figure 1B:
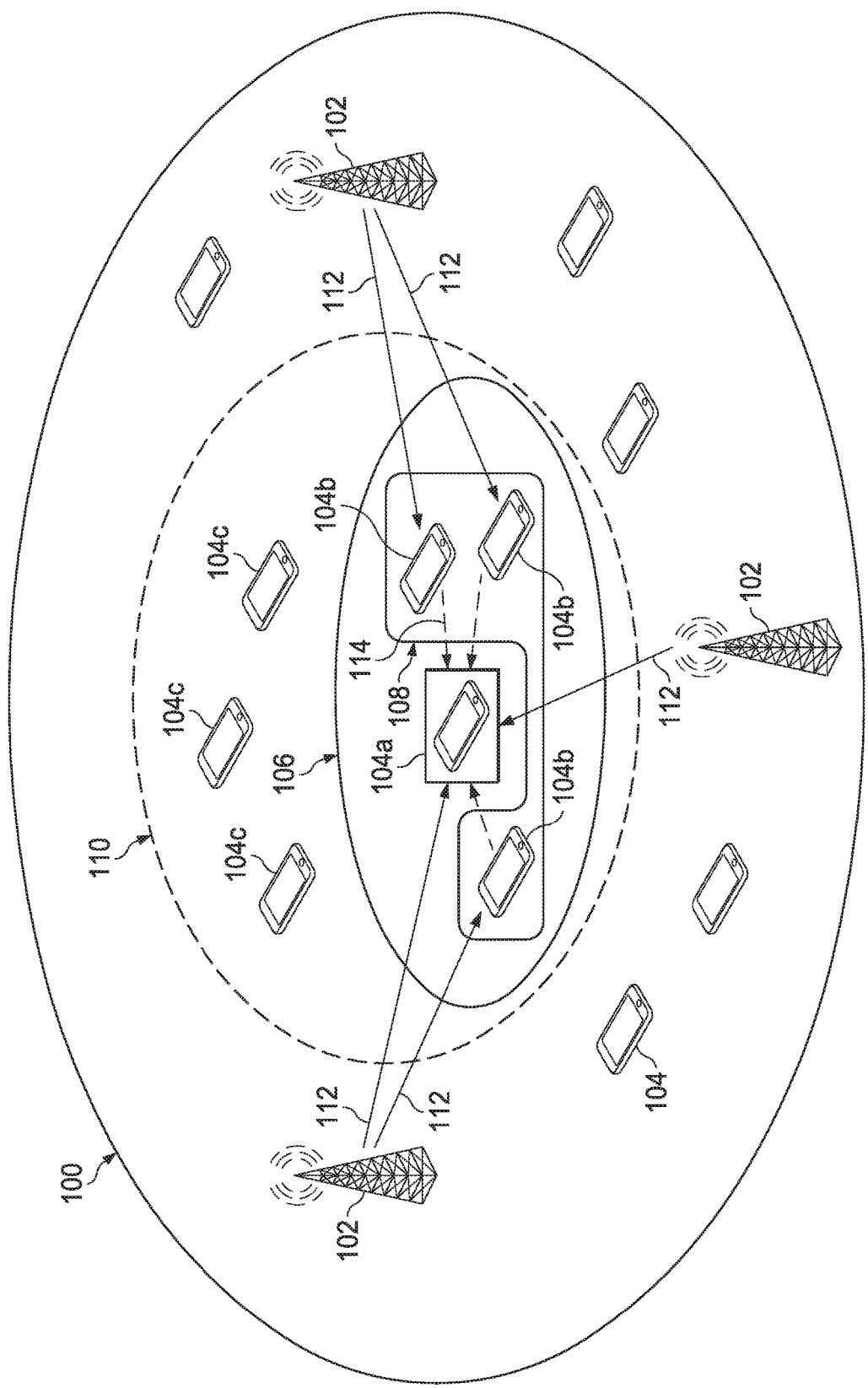

FIG. 1B illustrates a block diagram of network 120 operating in a multicasting/multipath system architecture in accordance with various alternative embodiments. Network 120 may be substantially similar to network 100, wherein like reference numerals represent like elements. For example, network 120 may include UEs 104. Communications between TUE 104a and the network may be done through a virtual multipoint transceiver 106, which may include CUEs 104b helping TUE 104a in uplink transmissions/downlink reception. Virtual multipoint transceiver 106 may be formed by selecting a CCS 110 and a CAS 108 on a TUE 104a centric basis.

However, transmission points 102 in network 120 may not be dynamically selected on a TUE 104a centric basis. Instead, individual transmission points 102 may cooperatively transmit packets to TUE 104a, for example, using a collaborative, rateless network-coding scheme. Other cooperative transmission schemes may also be used. Furthermore, CUEs 104b and/or potential CUEs 104c may be associated with the same or different transmission points 102 as TUE 104a. For example, compared to network 100, network 120 may not use G2G communications (e.g., network 120 may not include a virtual transmission point communicating with a virtual reception point). Instead, UEs 104 may be associated with one or more transmission points 102, which may be the same or different transmission points 102 associated with CUEs 104b/potential CUEs 104c.

Figure 2:
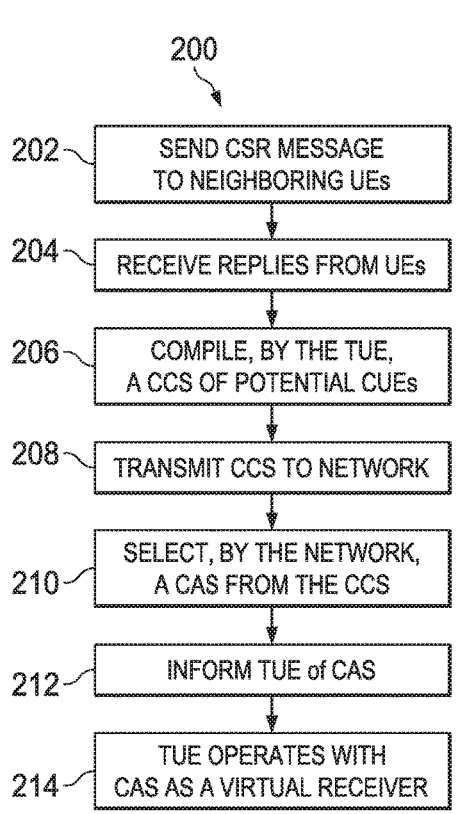
FIG. 2 illustrates a flow diagram of a method for selecting cooperating user equipment (CUE) for a virtual multipoint transceiver in accordance with various embodiments.

FIG. 2 illustrates a flow chart of a method 200 of selecting a virtual multipoint transceiver using a TUE selected CCS and a network controlled CAS in accordance with various embodiments. In step 202, a TUE (e.g., TUE 104a) seeks to form a virtual multipoint transceiver, for example, by broadcasting a cooperation seeking request (CSR) message to neighboring UEs (e.g., UEs 104 within transmission range of TUE 104a). The decision to form a virtual multipoint transceiver may be triggered by the TUE itself or by a network controller. For example, the network controller may instruct the TUE to from a virtual multipoint transceiver based on channel quality measurements (e.g., a channel quality indicator (CQI) report) of the TUE, retransmission times, retransmission frequency, or the like. The TUE may multicast the CSR message over D2D links (e.g., D2D links 114). In step 204, the TUE receives replies from UEs capable of and willing to form a virtual multipoint transceiver with the TUE. Next, in step 206, the TUE compiles a set of potential CUEs and generates a CCS. The potential CUEs may be selected from a plurality of UEs in the network, for example, based on relatively simple selection criteria such as the content and/or strength of received replies to the CSR message, physical proximity to the TUE, network associations (e.g., being connected to a same network or a different network), or the like. Steps 204 through 206 may be referred to as a potential CUE discovery phase. In step 208, the TUE informs the network (e.g., a transmission point 102 serving the TUE) about the selected CCS. CCSs in a network may be TUE-specific. Therefore, different TUEs in the network may select different CCSs.

In step 210, the network (e.g., transmission point 102) selects a CAS from the CCS for the TUE. In various embodiments, the CAS may be selected based on predicted availability of a potential CUE (e.g., based on UE traffic load), access link quality between a potential CUE and the transmission point (e.g., based on MIMO decoding capability), the number of reception antennas, mobility, a CQI report, D2D quality between the potential CUE and the TUE, combinations thereof, and the like. In step 212, the network informs the TUE of the selected CAS. The CAS is the set of CUEs, which together with the TUE form a virtual multipoint transceiver. The network may select a different CAS from corresponding CCSs for each TUE in the network. In step 214, the network may begin communicating with the TUE using the selected CAS to operate as a virtual multipoint transceiver.

Figure 3:
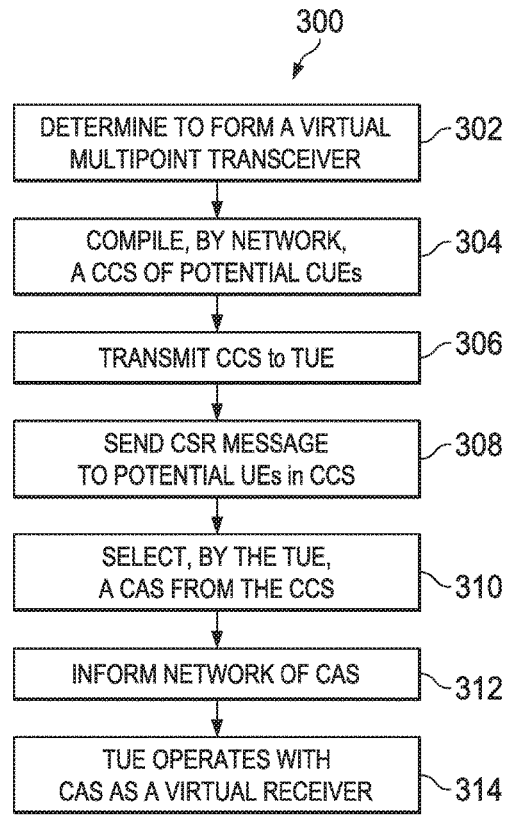
FIGS. 3 and 4 illustrate flow diagrams of a method for selecting CUEs for a virtual multipoint transceiver in accordance with various alternative embodiments.

FIG. 3 illustrates a flow chart 300 of a method of selecting a virtual multipoint transceiver using a network controlled CCS and a TUE selected CAS in accordance with various embodiments. In step 302, the network determines a virtual multipoint transceiver may be formed for a TUE. The network may determine a virtual multipoint transceiver may be formed based on receiving a CSR message from a TUE (e.g., the TUE may transmit the CSR message to a transmission point 102 serving the TUE). In other embodiments, the network may decide to form a virtual multipoint transceiver based channel quality measurements (e.g., a CQI report) of the TUE, retransmission times, retransmission frequency, or the like. In step 304, the network may compile a set of potential CUEs and generate a CCS for the TUE. The potential CUEs may be selected from a plurality of UEs in the network (e.g., all available UEs in the network) based on relatively simplistic selection criteria using status information of the potential CUEs and/or the network (e.g., location information, pathloss information, shadowing information, energy saving considerations, and the like). For example, the potential CUEs may be UEs within a certain diameter (e.g., with loom) of the TUE. As another example, the network may consider energy saving considerations and turn-off (or deactivate) certain transmission points 102. Thus, potential CUEs served by these inactive transmission points may not be selected for the CCS. In step 306, the network informs the TUE of the chosen CCS.

In step 308, the TUE may transmit a CSR message to potential CUEs in the CCS provided by the network. In step 310, the TUE may select a CAS from the potential CUEs of the CCS for forming a virtual multipoint transceiver. The selection of the CAS may be in accordance with received signal quality and/or content of replies to the CSR request. Because the replies may be sent over the D2D link, the CAS may be selected based on predicted D2D link quality. In such embodiments, the TUE may receive access link quality assessments from the potential CUEs in the reply, and the CAS selection may also account for access link quality as communicated. Next, in step 312, the TUE may inform the network of its selected CAS. Finally, in step 314, the network may begin communicating with the TUE using the selected CAS to operate as a virtual multipoint transceiver.

Figure 4:
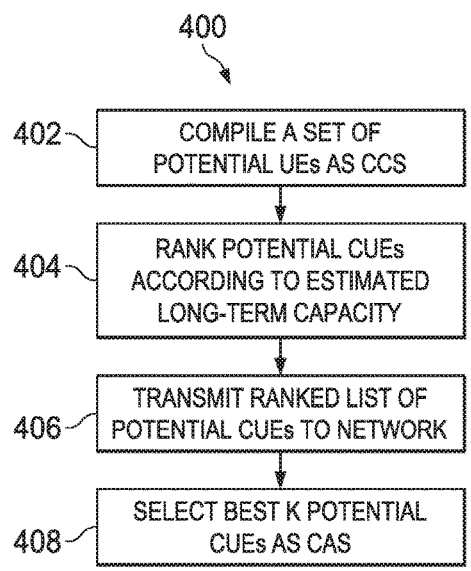

FIG. 4 illustrates a flow chart 400 of a method of a network/TUE jointly selected CAS in accordance with various embodiments. In step 402, a CCS is compiled. For example, the CCS may include potential CUEs selected either by the network or the TUE as described in FIG. 2 or 3, above. In step 404, the TUE may rank the potential CUEs in the CCS according to an estimate of long-term end-to-end average capacity of the CUE with respect to all transmission points 102 in each potential CUE's serving set. A potential CUE's serving set may include all transmission points 102 that could potentially form an access link with the potential CUE. Alternatively, the serving set may be any subset of transmission points of a virtual transmitter or any transmission point in a cloud radio access network (CRAN) cluster. The long term end-to-end average capacity may be calculated by the TUE using any suitable method. For example, for UEs operating in a half-duplex mode, the capacity of each potential CUE with respect to a particular transmission point may be estimated based end-to-end average capacity metrics in accordance with the half-duplex mode. An example formula for estimating the capacity using capacity metrics for a half-duplex mode is:

$$C_{TPi\text{->}CUEj\text{->}TUE}^{HD,CUEj} = \tfrac{1}{2}\log_2(1+\min\{SINR_{TPi\text{->}CUEj}, SINR_{CUEj\text{->}TUE}\})$$

$C_{TPi\text{->}CUEj\text{->}TUE}^{FD,CUEj}$ is the estimated long term end-to-end average capacity of a potential $CUE_j$ with respect to a transmission point $TP_i$. That is, $C_{TPi\text{->}CUEj\text{->}TUE}^{FD,CUEj}$ is an estimate of capacity for transmitting from $TP_i$ through $CUE_j$ to the TUE. $SINR_{TPi\text{->}CUEj}$ is the signal to noise ratio (SINR) between $CUE_j$ and $TP_i$ (i.e., access link quality), and $SINR_{CUEj\text{->}TUE}$ is the SINR between $CUE_j$ and the TUE (i.e., D2D link quality). SINRs of access links may be estimated based on long-term performance measurements signaled by the transmission points to the TUE. SINRs of D2D links may be estimated, for example, based on received replies to a CSR message, or the like. As another example, for UEs operating in a full-duplex mode, the capacity of each potential CUE with respect to a particular transmission point may be estimated based on end-to-end capacity metrics in accordance with the full-duplex mode. An example formula for estimating the capacity using capacity metrics for a full duplex mode is:

$$C_{TPi\text{->}CUEj\text{->}TUE}^{FD,CUEj} = \log_2\left(1 + \min\left(\frac{SINR_{TPi\text{->}CUEj}}{1 + SINR_{CUEj}^{RLI}}, SINR_{CUEj\text{->}TUE}\right)\right)$$

$SINR_{CUEj}^{RLI}$ is a residual loop interference of $CUE_j$ in the full duplex mode. The residual loop interference for full duplex relays may be estimated using any suitable estimation process.

In step 406, the TUE informs the network with the ranked list of potential CUEs. In step 408, the network may select the best K potential CUEs as the CAS. K is a configurable size of the CAS, for example, based on the desired level of complexity of virtual multipoint transceivers in the network. The selected CUEs may change depend on which transmission points 102 are currently associated with potential CUEs in the CCS.

In the embodiments described above, the CCS may be selected based on relatively simplistic selection criteria, such as, location of UEs relative to the TUE, received signal strength/content of a reply signal, or the like. Subsequently a CAS may be selected from the CCS based on estimated capacity, access link quality, D2D link quality, or a combination thereof. The pre-selection of the CCS based on relatively simplistic criteria reduces the estimation and link quality measurements necessary for selecting the CAS and thereby reduces the complexity of virtual multipoint transceiver configuration to a manageable level. For example, rather than predicting capacity/link quality for hundreds of UEs in a network, the CCS may include about ten potential CUEs. The number of CUEs in the CAS may also be selected to maintain transmission complexity (e.g., decoding complexity) at a manageable level. For example, the number CUEs in the CAS may be about two or three. Of course, depending on available resources of the network/TUE, a greater or fewer number of UEs may be selected for the CCS and/or the CAS. Furthermore, the CCS and the CAS may be updated on a semi-static basis to reduce the number of measurements taken in a network. That is, the CCS and the CAS may be based on long term performance measurements. For example, the CAS may be selected every hundred TTIs, and the CCS may be updated every few hundred TTIs.

Figure 5A:
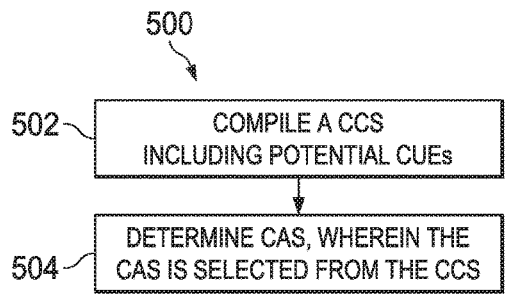
FIGS. 5A and 5B illustrate flow diagrams of methods for determining cooperating candidate sets (CCS) and cooperating active sets (CAS) in accordance with various embodiments.
Figure 5B:
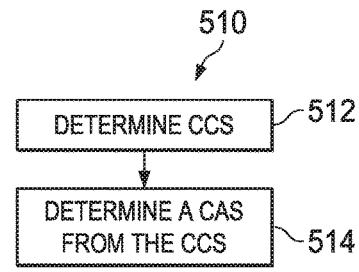

FIGS. 5A and 5B are flow charts of methods for determining a CCS and a CAS in accordance with various embodiments. FIG. 5A is directed towards compiling a CCS whereas FIG. 5B is directed towards selecting a CAS from the CCS. Referring to FIG. 5A, in step 502, a network device compiles a CCS for a specific TUE. The CCS is a set of potential CUEs selected from a plurality of UEs in the network (e.g., the CCS is a subset of all available UEs in the network) for forming a virtual multipoint transceiver with the TUE. The CCS may be TUE-centric (e.g., different CCSs may be compiled for different TUEs in the network). The network device may be the TUE or a transmission point. For example, in embodiments where the network device is a TUE, the TUE may transmit a CSR message to other UEs in the network, receive replies to the CSR message, and compile a CCS based on the replies (e.g., based on signal strength and/or content of the replies). In other embodiments where the network device is a transmission point, the CCS may be compiled based on location information of potential CUEs, shadowing information of potential CUEs, pathloss information of potential CUEs, energy saving considerations, and/or the like in relation to the TUE in the network. In such embodiments, the network device may be triggered to compile the CCS based on a CSR message from the TUE.

Next in step 504, the network device determines the CAS. The CAS is a set of CUEs selected from the CCS, wherein the set of CUEs and the TUE form a virtual multipoint transceiver. Determining the CAS may include transmitting the CCS to another network device and receiving the CAS from the other network device (e.g., the TUE or a transmission point). In such embodiments, the other network device selects the CAS from the CCS. Alternatively, determining the CAS may be a joint operation between the two network devices.

Referring next to FIG. 5B, in step 510, the network device determines the CCS. For example, the network device may receive the CCS from another network device. Alternatively, the network device may compile the CCS. In step 514, the network device may determine the CAS from the CCS. Determining the CAS may include the network device selecting the CAS from the CCS. For example, when the network device is a transmission point, the CAS may be selected from the CCS based on estimated availability of potential CUEs, access link quality between the potential CUEs and the transmission point (e.g., based on MIMO decoding capability, the number of reception antennas, mobility, a channel quality indicator (CQI) report), D2D quality between the potential CUE and the TUE, and/or the like. In other embodiments where the network device is the TUE, selecting the CAS may include transmitting a CSR message to potential CUEs in the CCS and selecting the CAS based on replies to the CSR message (e.g., based on content and/or signal strength of the replies).

In other embodiments, determining the CAS may include helping another network device to jointly select the CAS. For example, the network device may rank the potential CUEs in the CCS based on estimated long-term end-to-end capacity (e.g., for a full-duplex mode or a half-duplex mode). The ranked list may be transmitted to another network device, which may select the CUEs based on the ranked list and (optionally) other network information known to the other network device (e.g., current associations between transmission points and potential CUEs). The selected CAS may then be transmitted to the network device.

Figure 6:
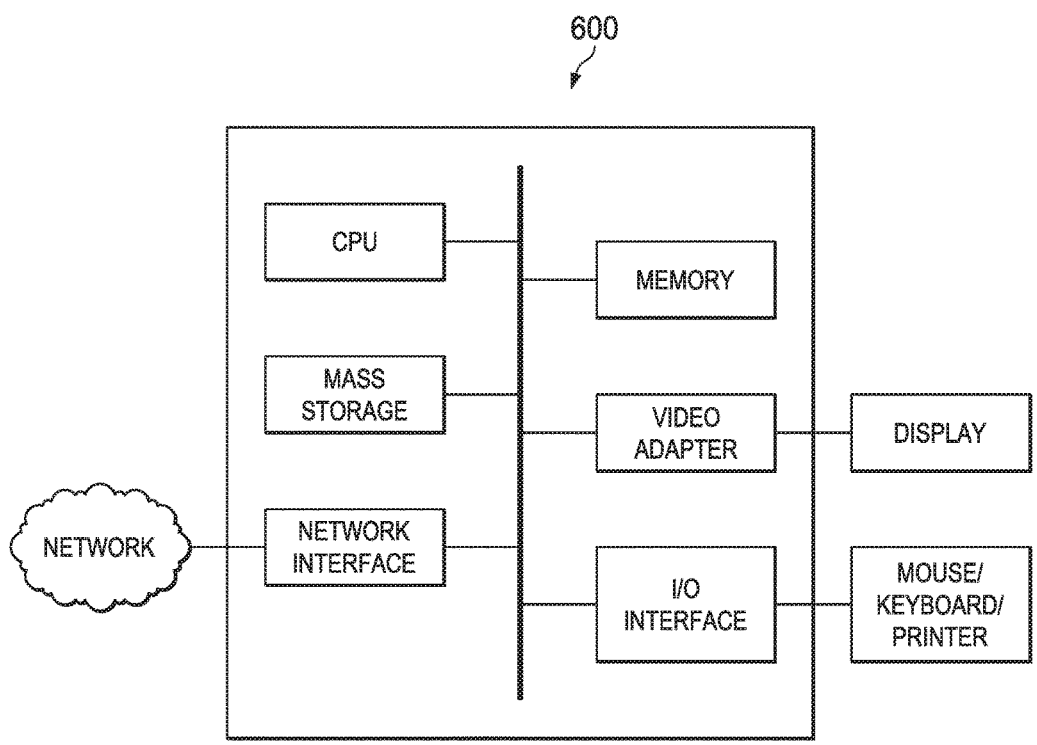
FIG. 6 is a block diagram of a computing system, which may be used to implement various embodiments.

FIG. 6 is a block diagram 600 of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not shown) may be used to provide a serial interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for forming a virtual multipoint transceiver comprising:
receiving, by a transmission point, first information indicating user equipments (UEs) selected to be members of a cooperation candidate set (CCS) for a target UE (TUE), wherein the CCS comprises a plurality of potential cooperating user equipment (CUEs) for selection to a cooperation active set (CAS); and
transmitting, by the transmission point, second information indicating the potential CUEs selected to be members of the CAS, wherein the TUE and a set of CUEs in the CAS form the virtual multipoint transceiver.

2. The method of claim 1, wherein receiving the first information comprises receiving, by the transmission point, the CCS from the TUE, wherein the TUE has accumulated the CCS by transmitting a cooperation seeking request (CSR) message to a plurality of UEs, by receiving replies to the CSR message from the plurality of UEs and by accumulating the CCS in accordance with the replies to the CSR message.

3. The method of claim 2, wherein receiving the replies to the CSR message comprises receiving the replies over device-2-device (D2D) links between the plurality of the potential CUEs and the TUE.

4. The method of claim 2, wherein receiving the first information is in accordance with signal strengths of the replies to the CSR message, content of the replies to the CSR message, physical proximity of each of the plurality of UEs in relation to the TUE, network associations of each of the plurality of UEs, or a combination thereof.

5. The method of claim 1, wherein receiving the first information comprises receiving, by the transmission point, reporting messages from potential CUEs of a received cooperation seeking request (CSR) message from the TUE, wherein the reporting messages were received via one or more access points, wherein the CSR messages were sent over device-2-device (D2D) links, and wherein the CCS is compiled in accordance with the reports of the CSR message received from the potential CUEs.

6. The method of claim 1, further comprising, transmitting, from the transmission point, an instruction to the TUE to form the virtual multipoint transceiver.

7. The method of claim 1, wherein receiving the first information comprises receiving the first information in accordance with location information of a plurality of UEs in a network, shadowing information of the plurality of UEs, pathloss information of the plurality of UEs, energy saving considerations, or a combination thereof.

8. The method of claim 1, further comprising sending, by the transmission point, a decision to form the virtual multipoint transceiver to the TUE.

9. The method of claim 8, wherein the decision to form the virtual multipoint transceiver is made based on a report of the TUE in accordance with channel quality measurements, retransmission times, retransmission frequency, or a combination thereof.

10. The method of claim 1, further comprising receiving, by the transmission point, a request to form the virtual multipoint transceiver from the TUE.

11. The method of claim 1, further comprising communicating between the transmission point and the virtual multipoint transceiver, wherein the set of CUEs and the TUE of the virtual multipoint transceiver cooperatively communicate with one or more access points.

12. The method of claim 11, wherein communicating between the virtual multipoint transceiver and the one or more access points comprises using a decode-and-forward (DF), an amplify-and-forward (AF), or a compress-and-forward (CF) relay protocol.

13. The method of claim 11, wherein the virtual multipoint transceiver operates as at least one of a virtual receiver during downlink transmissions or a virtual transmitter during uplink transmissions.

14. The method of claim 11, wherein the set of CUEs of the CAS help the TUE to receive downlink transmissions from the one or more access points, and transmit uplink transmissions to the one or more access points.

15. The method of claim 1, further comprising updating, by the transmission point, the CCS in accordance with one or more access points associated with the TUE or the plurality of potential CUEs.

16. The method of claim 1, further comprising dynamically updating, by the transmission point, the CAS based on short-term network conditions, short-term channel conditions, interference conditions, load conditions, CUE availability or a combination thereof.

17. The method of claim 1, wherein the CCS and the CAS are compiled and selected based on channel quality feedbacks of device-2-device (D2D) channels between the potential CUEs and the TUE and access link channels between the potential CUEs and one or more access points.

18. The method of claim 1, wherein the CCS is compiled semi-statically from a group of potential CUEs, and wherein the CAS is selected dynamically from the set of CUEs in the CCS.

19. The method of claim 1, wherein the CCS is compiled semi-statically from a group of potential CUEs, and wherein the CAS is selected dynamically such that the CAS changes when a cluster of serving access points for a TUE changes.

20. The method of claim 19, wherein the CAS is selected based on a quality of access links between the potential CUEs and the cluster of serving access points and a quality of device-2-device (D2D) links between the potential CUEs and the TUE.

21. A transmission point comprising:
a receiver configured to receive first information indicating user equipments (UEs) selected to be members of a cooperation candidate set (CCS) for a target UE (TUE), wherein the CCS comprises a plurality of potential cooperating user equipment (CUEs) for selection to a cooperation active set (CAS); and
a transmitter configured to transmit second information indicating the potential CUEs selected to be members of the CAS, wherein the TUE and a set of CUEs in the CAS form a virtual multipoint transceiver.

22. The transmission point of claim 21, wherein the transmitter is further configured to transmit an instruction to the TUE to form the virtual multipoint transceiver.

23. The transmission point of claim 21, wherein receiving the first information comprises receiving the first information in accordance with location information of a plurality of UEs in a network, shadowing information of the plurality of UEs, pathloss information of the plurality of UEs, energy saving considerations, or a combination thereof.

24. The transmission point of claim 21, wherein the transmitter is further configured to transmit a decision to form the virtual multipoint transceiver to the TUE, wherein the decision to form the virtual multipoint transceiver is made based on a report of the TUE in accordance with channel quality measurements, retransmission times, retransmission frequency, or a combination thereof.

25. A method for forming a virtual multipoint transceiver comprising:
transmitting, by a target user equipment (TUE), first information indicating user equipments (UEs) selected to be members of a cooperation candidate set (CCS) for the TUE, wherein the CCS comprises a plurality of potential cooperating user equipment (CUEs) for selection to a cooperation active set (CAS); and
receiving, by the TUE, second information indicating the potential CUEs selected to be members of the CAS, wherein the TUE and a set of CUEs in the CAS form the virtual multipoint transceiver.

26. The method of claim 25, further comprising:
transmitting, by the TUE, a cooperation seeking request (CSR) message to a plurality of UEs;
receiving replies to the CSR message from the plurality of UEs; and
accumulating the CCS in accordance with the replies to the CSR message.

27. The method of claim 26, wherein receiving the replies to the CSR message comprises receiving the replies over device-2-device (D2D) links between the plurality of the potential CUEs and the TUE.

28. The method of claim 26, wherein transmitting the first information is in accordance with signal strengths of the replies to the CSR message, content of the replies to the CSR message, physical proximity of each of the plurality of UEs in relation to the TUE, network associations of each of the plurality of UEs, or a combination thereof.

29. A target user equipment (TUE) comprising:
a transmitter configured to transmit first information indicating user equipments (UEs) selected to be members of a cooperation candidate set (CCS) for the TUE, wherein the CCS comprises a plurality of potential cooperating user equipment (CUEs) for selection to a cooperation active set (CAS); and
a receiver configured to second information indicating the potential CUEs selected to be members of the CAS, wherein the TUE and a set of CUEs in the CAS form a virtual multipoint transceiver.

30. The TUE of claim 29, wherein the transmitter is further configured to transmit a cooperation seeking request (CSR) message to a plurality of UEs, and wherein the receiver is further configured to receive replies to the CSR message from the plurality of UEs, for accumulating the CCS in accordance with the replies to the CSR message.

31. The TUE of claim 30, wherein the receiver is configured to receive the replies over device-2-device (D2D) links between the plurality of the potential CUEs and the TUE.

32. The TUE of claim 30, the transmitter is configured to transmit the first information in accordance with signal strengths of the replies to the CSR message, content of the replies to the CSR message, physical proximity of each of the plurality of UEs in relation to the TUE, network associations of each of the plurality of UEs, or a combination thereof.

\* \* \* \* \*